US012586460B2

(12) United States Patent
Gupta et al.

(10) Patent No.: US 12,586,460 B2
(45) Date of Patent: Mar. 24, 2026

(54) USER GUIDE SYSTEM FOR A PEDESTRIAN PATH

(71) Applicant: Toyota Motor Engineering & Manufacturing North America, Inc., Plano, TX (US)

(72) Inventors: Rohit Gupta, Santa Clara, CA (US); Benjamin Piya Austin, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 12 days.

(21) Appl. No.: 18/677,995

(22) Filed: May 30, 2024

(65) Prior Publication Data

US 2025/0371973 A1 Dec. 4, 2025

(51) Int. Cl.

| | |
|---|---|
| ***G08G 1/005*** | (2006.01) |
| ***B08B 5/00*** | (2006.01) |
| ***G08B 3/00*** | (2006.01) |
| ***G08B 5/00*** | (2006.01) |
| ***G08B 6/00*** | (2006.01) |

(52) U.S. Cl.

CPC ............... *G08G 1/005* (2013.01); *G08B 3/00* (2013.01); *G08B 5/00* (2013.01); *G08B 6/00* (2013.01)

(58) Field of Classification Search

None

See application file for complete search history.

(56) References Cited

U.S. PATENT DOCUMENTS

| | | | | |
|---|---|---|---|---|
| 2012/0223843 A1* | 9/2012 | Wall | ........................ | G08G 1/095 340/944 |
| 2022/0415163 A1* | 12/2022 | Nishimura | ............. | G08G 1/005 |

FOREIGN PATENT DOCUMENTS

| | | | |
|---|---|---|---|
| CN | 105894833 | A | 8/2016 |
| CN | 110176137 | A | 8/2019 |
| CN | 210827188 | U | 6/2020 |
| JP | 2016057858 | A | 4/2019 |
| KR | 101554971 | B1 | 9/2015 |
| KR | 101713252 | B1 | 3/2017 |
| KR | 101879383 | B1 | 7/2018 |
| KR | 102181222 | B1 | 11/2020 |
| KR | 102598190 | B1 | 11/2023 |
| RO | 202100014 | U2 | 10/2022 |
| WO | 2022144744 | A1 | 7/2022 |

* cited by examiner

*Primary Examiner* — John F Mortell

(74) *Attorney, Agent, or Firm* — Christopher G. Darrow; Darrow Mustafa PC

(57) ABSTRACT

Systems, methods, and other embodiments described herein relate to guiding a user travelling along a path. In one embodiment, a method includes predicting, by a processor, a behavior of a user based on at least sensor data received by the processor. The user is travelling on a pedestrian path. The method further includes, in response to a predicted behavior, controlling a guide, by the processor, to output the guide along the pedestrian path to direct the user.

17 Claims, 4 Drawing Sheets

USER GUIDE SYSTEM FOR A PEDESTRIAN PATH

TECHNICAL FIELD

The subject matter described herein relates, in general, to systems and methods for guiding a user along a pedestrian path.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some pedestrians traveling through a region that is shared with motorized vehicles may become distracted. In such a case, such pedestrians may inadvertently wander into the lanes of the motorized vehicles. Further, some pedestrians may not comply with traffic rules and walk towards and into the lanes of motorized vehicles.

SUMMARY

This section generally summarizes the disclosure and is not a comprehensive explanation of its full scope or all its features.

In one embodiment, a method for guiding a user travelling along a path is disclosed. The method includes predicting, by a processor, a behavior of a user based on at least sensor data received by the processor, and in response to a predicted behavior, controlling a guide by the processor to output the guide along the path to direct the user. The user is travelling on a path proximate to a lane for vehicle travel.

In another embodiment, a system for guiding a user travelling along a path is disclosed. The system includes a processor and a memory in communication with the processor. The memory stores machine-readable instructions that, when executed by the processor, cause the processor to predict a behavior of a user based on at least sensor data and in response to a predicted behavior, control a guide to output the guide along the path to direct the user. The user is travelling on a path proximate to a lane for vehicle travel.

In another embodiment, a non-transitory computer-readable medium for guiding a user travelling along a path and including instructions that, when executed by a processor, cause the processor to perform one or more functions, is disclosed. The instructions include instructions to predict a behavior of a user based on at least sensor data, and in response to a predicted behavior, control a guide to output the guide along the path to direct the user. The user is travelling on a path proximate to a lane for vehicle travel.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
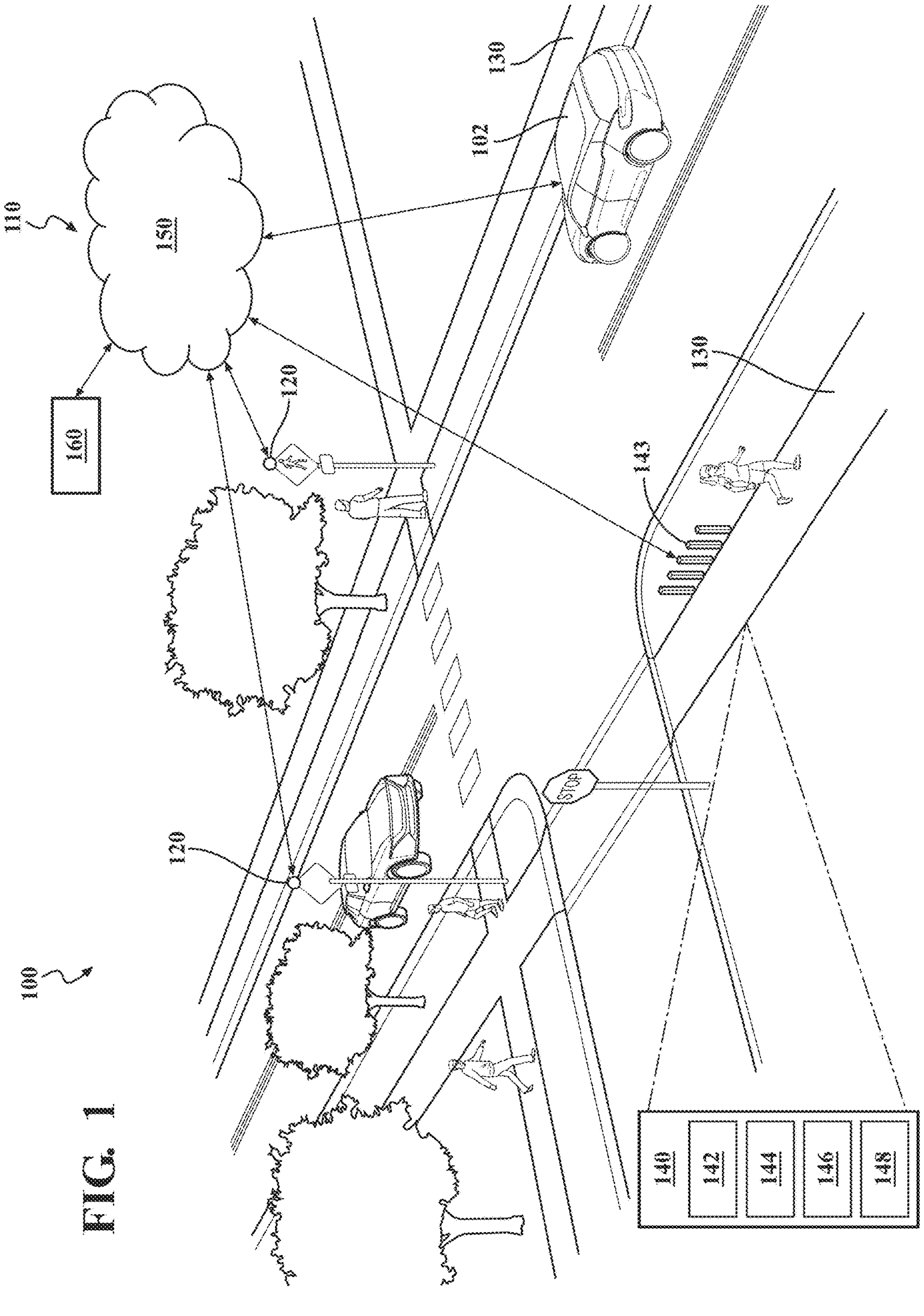
FIG. 1 is an example of a user guide system.

Systems, methods, and other embodiments associated with guiding a user travelling along a path, are disclosed. The path may be a pedestrian path, which may be utilized by a user walking, jogging, using a wheelchair, pushing a stroller, roller skating, inline skating, skateboarding, and/or any other suitable movement. The path may be proximate to a lane for vehicle travel. In general, the path may be proximate to a region that is inaccessible to a user or at least, the user is required to exercise caution as the access the region. Additionally and/or alternatively, the path may be partitioned into zones such as a safe zone and an unsafe zone. The safe zone refers to a portion of the path that is safe for the user to travel and the unsafe zone refers to a portion of the path that may be unsafe for the user to travel without caution. In other words, in the unsafe zone, the user may have to exercise a relatively higher amount of caution as the user travels through the unsafe zone. An unsafe zone may deemed unsafe due to the presence of vehicles including motorized vehicles and/or uneven terrain. A path may be partitioned based on a designated direction of travel. As an example, a path may be divided into two portions-one portion for users travelling in one direction and the other portion for users travelling in the opposite direction. This may be useful for crowd management at an event.

While some users may comply with directions of where to travel so as to remain safe, there may be some users who may venture into unsafe zones, by accident or intentionally. Current methods include passive restraints, which may be a fixed structure such as a fence. However, such methods are not responsive to changing situations. Further, such methods include barriers that may be easily breached. Also, such barriers are general barriers and are unable to respond to individual behaviors.

Accordingly, in one embodiment, the disclosed approach is a system that predicts when a user is venturing towards an unsafe zone and proceeds to redirect the user with a restraint and/or an alert to warn the user. The system may be used to restrain a non-compliant user as the restraints may discourage and/or deter users from going into or remaining in the unsafe zones. The restraint may be a physical barrier such as a retractable fence and/or poles that can be embedded in the ground and can be elevated to surround a user in an unsafe zone. The restraint may include haptic vibrations that cause a vibration on the user when the user is not in the safe zone. The restraint may include visible displays such as light displays that are visible to only the users not in the safe zones. The restraint may include an audio system with sounds that are only audible to users not in the safe zones. The haptic vibrations, the light displays, and/or the sounds may cause the user in the unsafe zone to some discomfort such that the user may return to the safe zone to prevent further discomfort.

The system may include partitioning an area into safe zones and unsafe zones based on map data and/or events occurring in the area such as music events, sporting events, school bus pick-ups and drop-offs. The system may then monitor users within the region using sensor data from sensors in surrounding infrastructure and surrounding vehicles. The sensor data may include eye movement data, as an example. The system may request and receive user data from a database. The user data may include information about users in the area such as whether the user has a history of travelling within the safe zones or venturing into the unsafe zones. The system may request and receive environment data from a database. The environment data may include time of day, weather, precipitation levels, traffic levels, road damage, and/or current events. The system may then utilize one or more of the sensor data, the user data, and the environment data to predict the behavior of a user. The system may then control a guide to restrain and/or alert the user. In some embodiments, the restraints may be virtual using the haptic system, the visual display, and the audio system. Some embodiments may further include a physical restraint such as a retractable physical barrier.

The system may further include communicating with surrounding or proximate vehicles to alert the vehicle about a user in an unsafe zone.

The embodiments disclosed herein present various advantages over the current methods. First, the embodiments are responsive to the behavior of users in the area and are not passive like previous methods. Second, the embodiments may include virtual barriers that do not occupy space in the area. Third, the embodiments are able to predict the behavior of users in the area and respond prior to the user accomplishing the behavior. Fourth, the embodiments are capable of restraining non-compliant users that are not following the traffic instructions. Fifth, the embodiments may be used to guide users on, as an example, sidewalks, crosswalks, school zones, emergency areas, high traffic locations, areas with high levels of interaction between users and vehicles, and/or public transportation locations.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a user guide system 100 is illustrated. The user guide system 100 may include various elements, which may be communicatively linked in any suitable form. As an example, the elements may be connected, as shown in FIG. 1. Some of the possible elements of the user guide system 100 are shown in FIG. 1 and will now be described. It will be understood that it is not necessary for the user guide system 100 to have all the elements shown in FIG. 1 or described herein. The user guide system 100 may have any combination of the various elements shown in FIG. 1. Further, the user guide system 100 may have additional elements to those shown in FIG. 1. In some arrangements, the user guide system 100 may not include one or more of the elements shown in FIG. 1. Further, it will be understood that one or more of these elements may be physically separated by large distances.

The elements of the user guide system 100 may be communicatively linked through one or more communication networks 110. As used herein, the term "communicatively linked" can include direct or indirect connections through a communication channel or pathway or another component or system. A "communication network" means one or more components designed to transmit and/or receive information from one source to another. The one or more of the elements of the user guide system 100 may include and/or execute suitable communication software, which enables the various elements to communicate with each other through the communication network 110 and perform the functions disclosed herein.

The one or more communication networks 110 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 110 can be further implemented as or include one or more wireless networks, whether short-range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network 110 can include wired communication links and/or wireless communication links. The communication network 110 can include any combination of the above networks and/or other types of networks including vehicle-to-everything (V2X) communication systems.

The user guide system 100 can include one or more sensors 120. "Sensor" means any device, component and/or system that can detect, determine, assess, monitor, measure, quantify, acquire, and/or sense something. The one or more sensors 120 can detect, determine, assess, monitor, measure, quantify, acquire, and/or sense in real-time. As used herein, the term "real-time" means a level of processing responsiveness that a user or a system senses as sufficiently immediate for a particular process or determination to be made, or that enables a processor to keep up with some external process.

The sensors 120 may be located in an environment that includes a path 130 for pedestrian travel. As an example, the sensors 120 may be standalone sensors installed along the path or in an area surrounding the path 130. Additionally and/or alternatively, the sensors 120 may be a part of existing infrastructure such as traffic lights, traffic signs, and/or street signs. Further, sensors 120 may be located in edge devices, vehicles, and/or mobile devices such as mobile phones and wearable devices. The sensors 120 may include a global positioning system (GPS), one or more cameras, one or more radar sensors, one or more LIDAR sensors, one or more Radio Frequency Identification (RFID) tags, one or more eye movement sensors, long range sensors, and/or any other suitable type of sensors.

The user guide system 100 may include one or more guides 140. The guide 140 may include a physical barrier 142, a haptic system 144, an audio system 146, and/or a visual display 148. As an example and as shown, the physical barrier 142 may be a physical structure such as a plurality of retractable poles 143. The physical barrier 142 is described in more detail in FIGS. 2A-2B. The haptic system 144 may utilize ultrasound to project tactile sensation on the skin of users that are not on a safe path 130. The haptic system 144 may create a virtual fence around the safe path 130 such a user that is not on the safe path 130 feels a vibration on their skin while a user that is on the safe path 130 does not feel the vibration on their skin. The haptic system 144 may output a tactile sensation that may cause the user some discomfort such that the user may be compelled to move back to the safe path 130.

The audio system 146 may include, as an example, three-dimensional spatial audio. As such, the audio system 146 is capable of outputting sound in a directional manner. As an example, the audio system 146 may output a sound such as a high frequency sound that is audible to users that are not on a safe path 130 and inaudible to users that are on the safe path 130. The safe path 130 refers to the part of the path that the user guide system 100 has determined is safe and is guiding the users to follow. The audio system 146 may include speakers. The audio system 146 may be freestanding and/or may be fixed to infrastructure in the area. The audio system 146 may output a sound that may cause the user some discomfort such that the user may be compelled to move back to the safe path 130.

The visual display 148 may include a light display. As an example, the visual display 148 may output lights that are arrows, borders, and/or relay a message to the pedestrians. The visual display 148 may be projected on the ground and/or any suitable screens mounted along the path and/or around the safe path 130. The visual display 148 may vary the color, brightness, and/or tempo of the images being displayed. The visual display 148 may, as an example, utilize multi-prism technology to deliver localized light and localized displays. The visual display 148 may output light that may cause the user some discomfort due to the brightness, the color, and/or the tempo such that the user may be compelled to move back to the safe path 130.

The user guide system 100 can include one or more servers 150. The server(s) 150 may be, for example, cloud-based server(s) or edge-based server(s). The server(s) 150 can communicate with controller(s) 160, the sensor(s) 120, vehicle(s) 102, and/or the guide(s) 140 over the communication network(s) 110 and/or other suitable means such as by any type of vehicle-to-cloud (V2C) communications or vehicle-to-everything (V2X) communications, now known or later developed. The server(s) 150 can receive data from and send data to the controller(s) 160, the sensor(s) 120, vehicle(s) 102, and/or the guide(s) 140.

The user guide system 100 may include one or more controllers 160 for receiving sensor data from one or more sensors 120, determining and/or predicting the position of one or more users based on the sensor data, and then determining which action to take based on the determination and/or prediction. The controllers 160 are described in greater detail below.

Figure 2A:
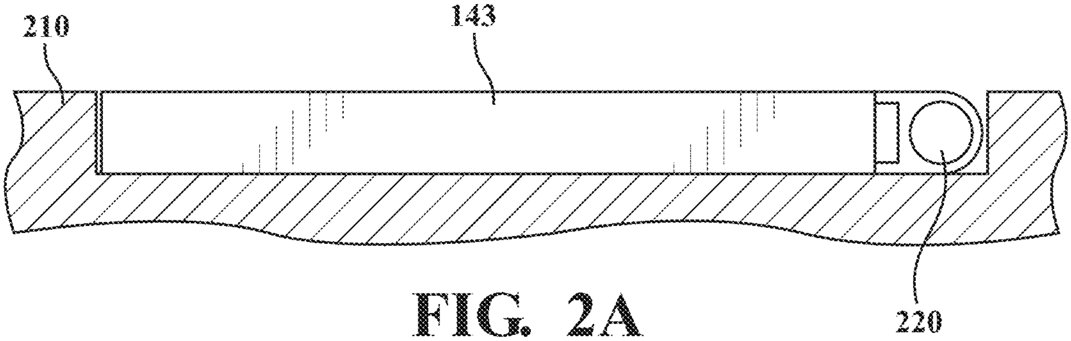
FIGS. 2A-2B illustrate an example of a physical barrier.
Figure 2B:
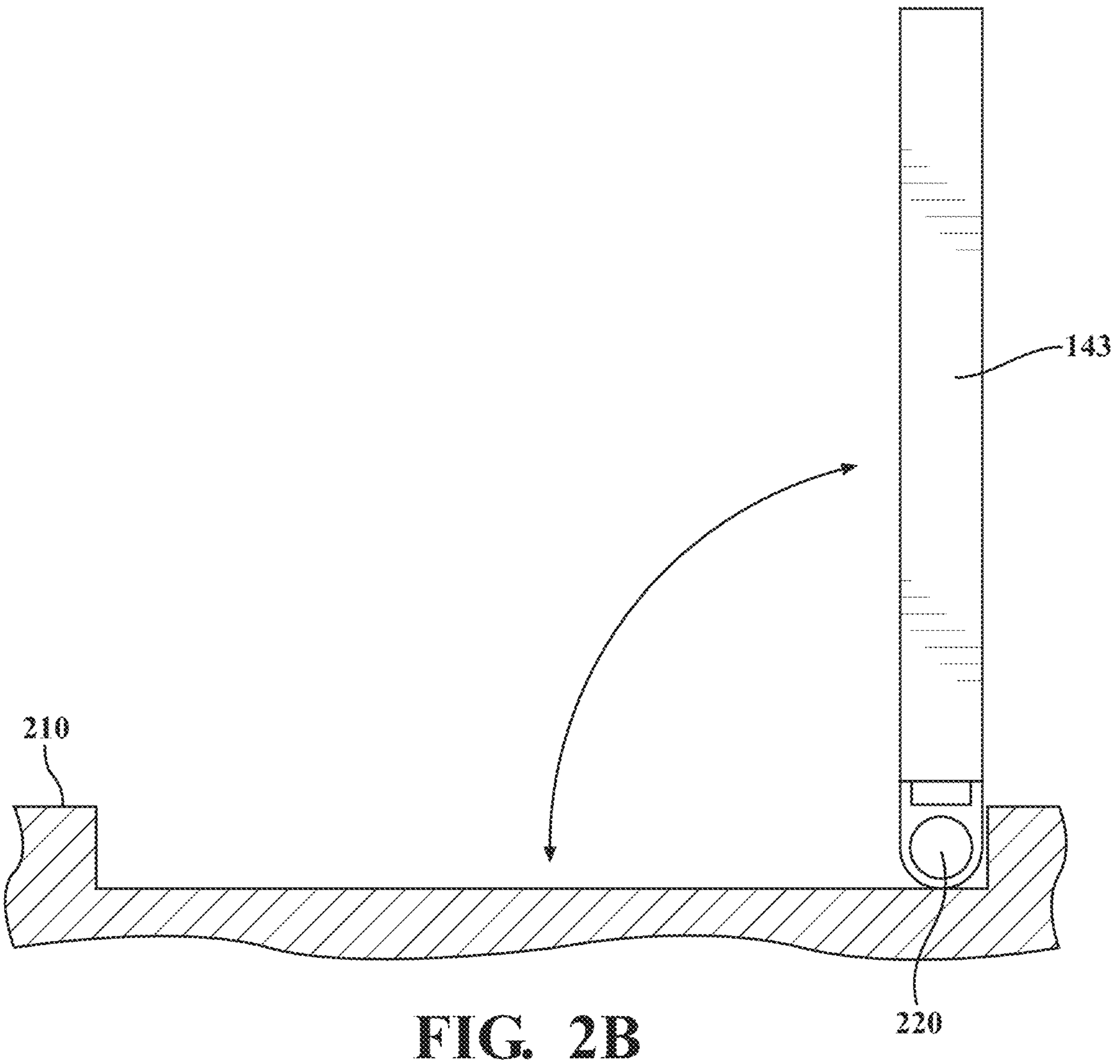

Referring to FIGS. 2A-2B, an example of a physical barrier 142 is illustrated. As previously mentioned, the physical barrier 142 may be a plurality of poles 143. As an example and as shown in FIG. 2A, the pole 143 may be embedded in the ground 210 of the area and the pole 143 may be fixed to an actuator 220. As shown in FIG. 2B, the pole 143 may be in an upright position. The actuator 220 is communicatively linked with the controller 160 and in response to instructions from the controller 160, the actuator 220 may move the pole 143 from an embedded position in the ground 210, as shown in FIG. 2A, to the upright position, as shown in FIG. 2B. Also, in response to instruction from the controller 160, the actuator 220 may move the pole from the upright position to the embedded position. The physical barrier 142 may include sensors 120 such that the actuators 220 do not move the physical barrier when a user is within the range of motion of the physical barrier 142 so as to prevent a collision between the physical barrier 142 and the user. As another example, the physical barrier 142 may be fencing material that may be stored underground and may emerge in response to instructions from the controller 160. The physical barrier 142 may be of any suitable material such as metal, plastic, and/or wood. The physical barrier 142 may include chains or woven material that may be rolled up when stored underground.

Figure 3:
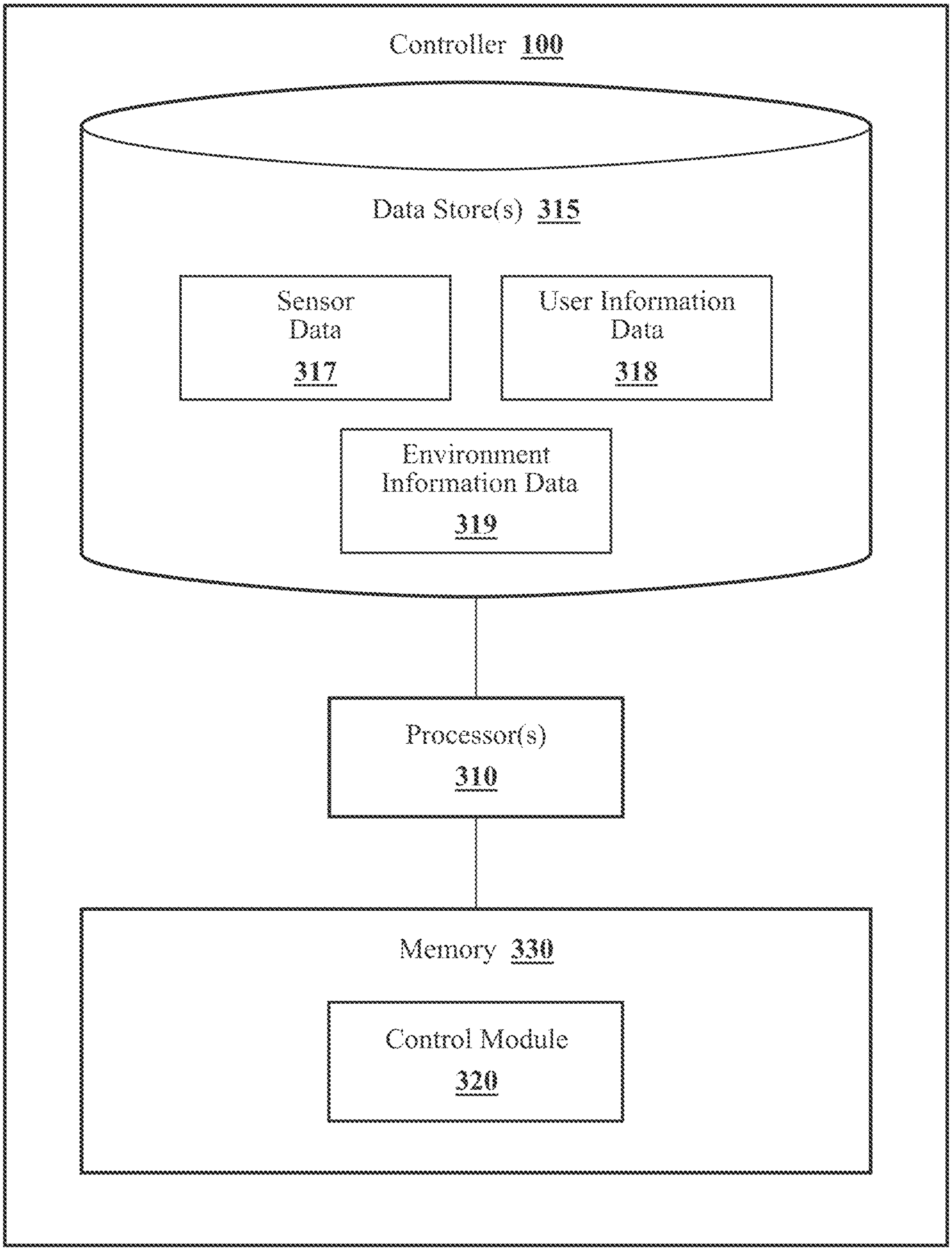
FIG. 3 is a block diagram of a controller in the user guide system of FIG. 1.

With reference to FIG. 3, a block diagram of the controller 160 is shown. The controller 160 may include a processor(s) 310. Accordingly, the processor(s) 310 may be a part of the controller 160, or the controller 160 may access the processor(s) 310 through a data bus or another communication pathway. In one or more embodiments, the processor(s) 310 is an application-specific integrated circuit that may be configured to implement functions associated with a control module 320. More generally, in one or more aspects, the processor(s) 310 is an electronic processor, such as a microprocessor that can perform various functions as described herein when loading the control module 320 and executing encoded functions associated therewith.

The controller 160 may include a memory 330 that stores the control module 320. The memory 330 may be a random-access memory (RAM), read-only memory (ROM), a hard disk drive, a flash memory, or other suitable memory for storing the control module 320. The control module 320 includes, for example, computer-readable instructions that, when executed by the processor(s) 310, cause the processor(s) 310 to perform the various functions disclosed herein. While, in one or more embodiments, the control module 320 is a set of instructions embodied in the memory 330, in further aspects, the control module 320 includes hardware, such as processing components (e.g., controllers), circuits, etc. for independently performing one or more of the noted functions.

The controller 160 may include a data store(s) 315 for storing one or more types of data. Accordingly, the data store(s) 315 may be a part of the controller 160, or the controller 160 may access the data store(s) 315 through a data bus or another communication pathway. The data store(s) 315 is, in one embodiment, an electronically based data structure for storing information. In at least one approach, the data store 315 is a database that is stored in the memory 330 or another suitable medium, and that is configured with routines that can be executed by the processor(s) 310 for analyzing stored data, providing stored data, organizing stored data, and so on. In either case, in one embodiment, the data store 315 stores data used by the control module 320 in executing various functions. In one embodiment, the data store 315 may be able to store sensor data 317, user information data 318, environment information data 319, and/or other information that is used by the control module 320.

The data store(s) 315 may include volatile and/or non-volatile memory. Examples of suitable data stores 315 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 315 may be a component of the processor(s) 310, or the data store(s) 315 may be operatively connected to the processor(s) 310 for use thereby. The term “operatively connected” or “in communication with” as used throughout this description, can include direct or indirect connections, including connections without direct physical contact.

In one or more arrangements, the data store(s) 315 can include sensor data 317. The sensor data 317 can originate the one or more sensors 120. The sensor data 317 may include images and movement data of the users, eyes of the users, and/or vehicles travelling on nearby lanes.

In one or more arrangements, the data store(s) 315 can include user information data 318. The user information data 318 may include information about the users walking along the path. As an example, the user information data 318 may include a profile of the user(s). The profile may include a name and/or other identifying information for the users, whether the user has a history of walking safely along the path 130, staying within the safe path 130, responding to guides 140 and/or alerts, participating in dangerous behavior such as jaywalking, distracted lane crossing, and/or ignoring traffic signs.

In one or more arrangements, the data store(s) 315 can include environment information data 319. The environment information data 319 may include information about the environment surrounding the user guide system 100. As an example, the environment information data 319 may include factors such as a time of day, events occurring in the environment such as a sport game at an arena, the weather, as well as the associated traffic for each of those factors. The environment information data 319 may include traffic levels, weather conditions, location, condition, and other characteristics of the environment surrounding the user guide system 100. The sensor data 317, the user information data 318, and the environment information data 319 may be digital data that describe information used by the user guide system 100.

In one embodiment, the control module 320 may include instructions that, when executed by the processor(s) 310, cause the processor(s) 310 to predict a behavior of a user based on at least sensor data 317. The user is travelling on a pedestrian path. The control module 320 may divide an area into safe zones and unsafe zones. Safe zones are areas where the users such as pedestrians may travel without encountering or more specifically, colliding with a vehicle 102. Unsafe zones are areas where a user such as a pedestrian may encounter or collide with a vehicle 102 such as a motorized vehicle. The control module 320 may receive map data from a database and may utilize machine learning techniques and/or imaging processes to identify safe zones within the map data. Alternatively and/or additionally, the control module 320 may receive map data for an area from a database, and the map data may include the area being divided into regions with designated uses. As an example, the map data may include a region for pedestrians, a region for wheelchair users, a region for cyclists, and/or a region for motor vehicles. As another example, the map data may include a region for users moving in one direction and a region for users moving in the opposite direction. In general, the control module 320 may divide the area into any suitable number of designated regions based on factors such as current events, time of day as well as the needs of the users and/or vehicles. The control module 320 may receive the map with designated regions from a source, such as by user input. The control module 320 may then create geofences demarcating the safe zones from the unsafe zones based on the designated regions. As an example, the control module 320 may create a geofence around a sidewalk, separating the sidewalk from the road where vehicles are travelling.

The control module 320 may receive sensor data 317 from the sensors 120 in the area. The sensor data 317 may include images and/or videos of the user. The sensor data 317 may further include images and/or videos of the eyes of the user. The videos may show the movement of the user and/or movement of the eyes of the user.

The control module 320 may receive user information data 318. As an example, the control module 320 may identify a user using the images and/or videos in the sensor data 317. The control module 320 may utilize any suitable image processing technique to identify the user(s). The control module 320 may then access a database having user information data 318 which includes information about the users. As an example, the user information data 318 may include records of the user’s past behavior such as jaywalking and ignoring traffic signs.

The control module 320 may then predict a behavior of a user. As an example, the control module 320 may predict the behavior of the user based on at least sensor data 317. Alternatively and/or additionally, the control module 320 may predict the behavior of the user based on the user information data 318 and/or the environment information data 319. The control module 320 may utilize any suitable machine learning techniques and/or artificial intelligence processes to predict the behavior of the user.

Additionally and/or alternatively, the control module 320 may predict the behavior of the user based on the eye movement of the user. As an example, the control module 320 may utilize eye tracking to monitor the movement of the user’s eyes. The control module 320 may determine whether the user’s eyes are following an object and if so, which object using image processing and/or object tracking methods. The control module 320 may utilize any suitable algorithm or processes to determine a likelihood of the user moving toward or away from the object. The control module 320 may determine whether the user is likely to exhibit impulsive behavior such as moving from the safe zone to the unsafe zone based on the movement of the user and/or the eye movement of the user. The control module 320 may utilize machine learning techniques to determine the predicted behavior and/or identify current behavior. As an example, the predicted and/or actual behavior may be jay walking, distracted street crossing, ignoring traffic signals, unexpectedly changing directions, engaging in risky behavior around vehicles, making impulsive decisions in hazardous situations, tailgating and/or chasing after a vehicle. Jaywalking may include crossing a street without regard for traffic signals, crosswalk locations, and/or approaching vehicle(s). Distracted crossing may include engaging in distracted behavior while crossing the street, such as talking or texting on a cellphone, listening to music with headphones at high volume, or being absorbed in other distractions that hinder awareness of traffic. Ignoring traffic signals may include disregarding traffic signals and/or pedestrian signals at intersections and/or attempting to cross a street against the traffic signals or when it is unsafe to cross. Unexpected changes in direction may include abruptly changing direction and/or darting around moving vehicles without warning which may potentially catch vehicle users off guard and lead to an increased risk of a collision. Engaging in risky behavior around vehicles may include engaging in reckless behavior such as running across multiple lanes between vehicles, crossing at blind spots, or attempting to cross busy roads without adequate caution. Impulsive decisions in hazardous situations may include trying to beat a rapidly approaching vehicle or attempting to cross a flooded street without assessing the risks. Tailgating or chasing after a vehicle may include running after moving public transportation such as buses, trains, or trams in an impulsive attempt to catch them while risking personal safety.

In one embodiment, the control module 320 may include instructions that, when executed by the processor(s) 310, cause the processor(s) 310 to, in response to a predicted behavior, control a guide 140 to output the guide 140 along the pedestrian path to direct the user. The control module 320 may, in response to the predicted behavior, control the guide 140 to output an alert. Additionally and/or alternatively, the control module 320 may, in response to a current behavior, control the guide 140 to output the guide 140 along the pedestrian path to direct the user and/or output an alert. Upon predicting the behavior and/or upon determining the current behavior, the control module 320 may determine an action for the guide 140 to perform. As previously mentioned, the guide 140 may include a physical barrier 142, a haptic system 144, an audio system 146, and/or a visual display 148. In a case where the guide 140 includes one or more of the physical barrier 142, the haptic system 144, the audio system 146, and/or the visual display 148, the control module 320 may select the one or more of the guides 140 to control in response to the predicted and/or current behavior. The control module 320 may utilize any suitable algorithm, machine learning method, artificial intelligence process, and/or look-up tables to determine an effective response to the predicted and/or current behavior using the guides 140 as well as which of the guides 140 to activate based on the predicted and/or current behavior. The control module 320 may determine an effective response to the predicted and/or current behavior based on the characteristics of the predicted and/or current behavior using any suitable methods including machine learning methods, artificial intelligence processes, and/or lookup tables. As an example, the control module 320 may determine the risk factor associated with the predicted and/or current behavior. In such an example, the control module 320 may select the physical barrier 142 if the user is moving towards a moving vehicle 102 and may select an audio system 146 if the user is moving towards a stationary vehicle 102. As such, the control module 320 may select and activate one or more guides 140 and/or one or more alerts based on the predicted and/or current behavior.

The control module 320 may determine whether the user is outside a safe zone within the pedestrian path, and in response to the user being outside the safe zone, control the guide 140 to output an alert. Additionally and/or alternatively, the control module 320 may select one or more of the guides 140 to restrain the user. As an example, the control module 320 may receive sensor data 317, and may determine from the sensor data 317 that the user is located outside the safe zone. In response to the determination, the control module 320 may select one or more of the guides 140 to output an alert to warn the user. As an example, the control module 320 may output an audible alert, informing the user that the user is outside the safe zone. In general, the control module 320 may output an audio alert, a visual alert, and/or a haptic alert. The audio alert may warn the user and may be emitted from speakers embedded in the ground 210 and/or surrounding infrastructure. The visual alert may be a light display on the ground 210 and/or any surface visible to the user, also showing a warning. The visual alert may be emitted from a projector, as an example. The haptic alert may be a vibration on the skin of the user through the air and/or a vibration of the ground under the user. The control module 320 may include instructions that, when executed by the processor(s) 310, cause the processor(s) 310 to, in response to the user being outside the safe zone, control a physical barrier 142 proximate to the user to erect the physical barrier 142 proximate to the user. As an example, the control module 320 may control the physical barrier 142 to emerge from the ground 210 and surround the user that is not in the safe zone.

The control module 320 may also transmit an alert to one or more vehicles 102 in the area using as an example, V2X (vehicle to everything) communication. As such, the control module 320 may transmit a warning to operators of the vehicles 102. Additionally and/or alternatively, the control module 320 transmits a recommendation such as a reduced speed limit to the vehicle and/or the operator of the vehicle 102. The control module 320 may identify the vehicle(s) 102 proximate to the user that is outside the safe zone and may transmit a visual and/or audible alert to the vehicle(s) 102 and/or the operator of the vehicle(s) 102.

Figure 4:
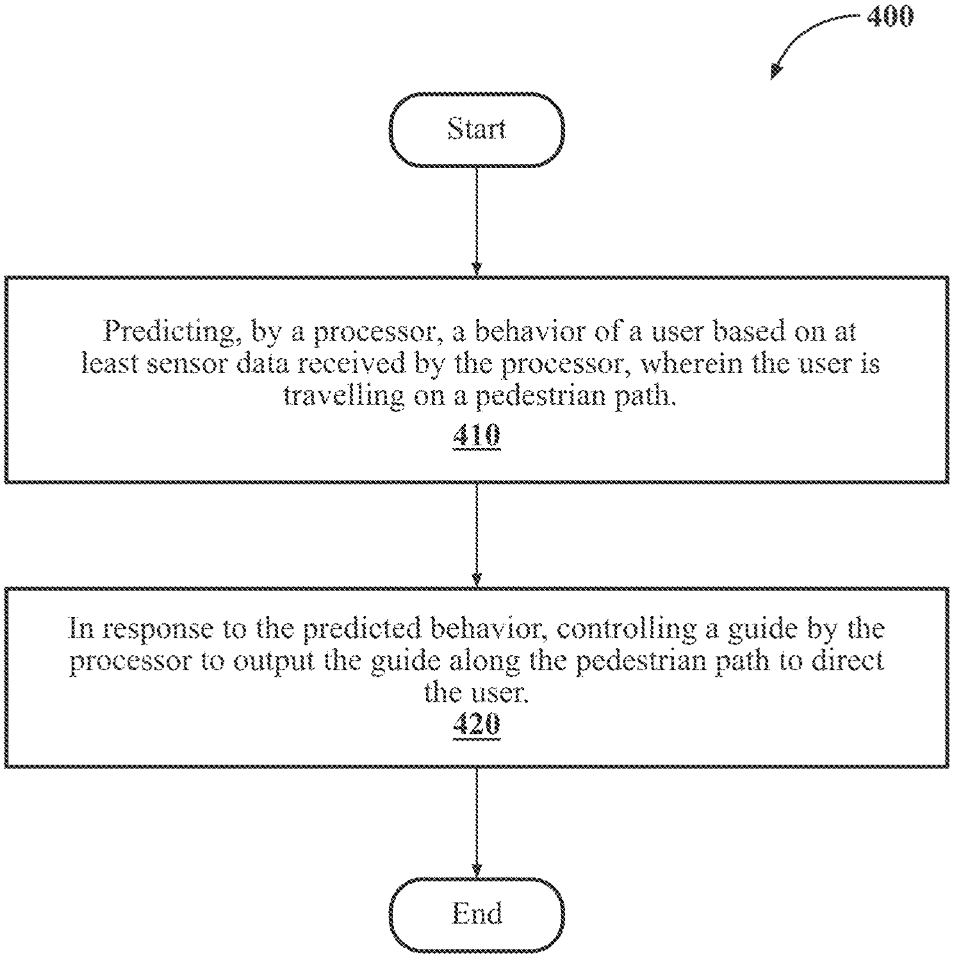
FIG. 4 is an example of a method for guiding a user travelling along a path.

FIG. 4 is an example of a method 400 for guiding a user travelling along a path. The method 400 will be described from the viewpoint of the user guide system 100 of FIG. 1 and the controller 160 of FIGS. 1 and 3. However, the method 400 may be adapted to be executed in any one of several different situations and not necessarily by the user guide system 100 of FIG. 1 and/or the controller 160 of FIGS. 1 and 3.

At step 410, the control module 320 may cause the processor(s) 310 to predict a behavior of a user based on at least sensor data 317 received by the processor(s) 310. The user is travelling on a pedestrian path. The control module 320 may predict the behavior of the user based on historical information such as the user information data 318 and/or environment information data 319. The control module 320 may further utilize current information of the user and/or the environment to predict the behavior of the user.

At step 420, the control module 320 may cause the processor(s) 310 to, in response to a predicted behavior, control a guide 140 to output the guide 140 along the pedestrian path to direct the user. The guide 140 may be one or more of a physical barrier 142, a haptic system 144, an audio system 146, and/or a visual display 148. As previously mentioned, the control module 320 may determine a suitable response to the predicted behavior using any suitable method such as machine learning techniques. The control module 320 may then activate the guide 140 such as erecting the physical barrier 142, outputting a vibration from the haptic system 144, an audible sound from the audio system 146, and/or an image from the visual display 148. Additionally and/or alternatively, the control module 320 may control the guide 140 to output an alert, warning the user.

The control module 320 may determine whether the user is outside a safe zone within the pedestrian path and in response to the user being outside the safe zone, control the guide 140 to output an alert. The control module 320 may utilize sensor data 317 to determine the location of the user and whether the user is in the safe zone. In response to determining that the user is not in the safe zone, the control module 320 may control the guide 140 to output an alert. The alert may be one of more of an audio alert, a visual alert, and/or a haptic alert. Additionally and/or alternatively, the control module 320 may control a physical barrier 142 proximate to the user to erect the physical barrier 142 proximate to the user, in response to the user not being in the safe zone.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:

predicting, by a processor, a behavior of a user based on at least sensor data received by the processor, the user travelling on a pedestrian path;

in response to a predicted behavior, controlling a guide by the processor to output the guide along the pedestrian path to direct the user; and in response to the user being outside a safe zone, controlling by a processor, a physical barrier proximate to the user to erect the physical barrier proximate to the user.

2. The method of claim 1, further comprising:

predicting the behavior of the user based on historical information.

3. The method of claim 1, further comprising:

determining whether the user is outside the safe zone within the pedestrian path; and in response to the user being outside the safe zone, controlling the guide by the processor to output an alert.

4. The method of claim 3, wherein the alert includes at least one of:

an audio alert;

a visual alert; or a haptic alert.

5. The method of claim 1, wherein the guide includes at least one of:

a physical barrier;

a haptic system;

an audio system; or a visual display.

6. The method of claim 1, further comprising:

in response to the predicted behavior, controlling the guide by the processor to output an alert.

7. A system comprising:

a processor; and a memory storing machine-readable instructions that, when executed by the processor, cause the processor to:

predict a behavior of a user based on at least sensor data, the user travelling on a pedestrian path;

in response to a predicted behavior, control a guide to output the guide along the pedestrian path to direct the user; and in response to the user being outside a safe zone, control a physical barrier proximate to the user to erect the physical barrier proximate to the user.

8. The system of claim 7, wherein the machine-readable instructions further include instructions that when executed by the processor cause the processor to:

predict the behavior of the user based on historical information.

9. The system of claim 7, wherein the machine-readable instructions further include instructions that when executed by the processor cause the processor to:

determine whether the user is outside the safe zone within the pedestrian path; and in response to the user being outside the safe zone, control the guide to output an alert.

10. The system of claim 9, wherein the alert includes at least one of:

an audio alert;

a visual alert; or a haptic alert.

11. The system of claim 7, wherein the guide includes at least one of:

a physical barrier;

a haptic system;

an audio system; or a visual display.

12. The system of claim 7, wherein the machine-readable instructions further include instructions that when executed by the processor cause the processor to:

in response to the predicted behavior, control the guide to output an alert.

13. A non-transitory computer-readable medium including instructions that when executed by a processor cause the processor to:

predict a behavior of a user based on at least sensor data, the user travelling on a pedestrian path;

in response to a predicted behavior, control a guide to output the guide along the pedestrian path to direct the user; and in response to the user being outside a safe zone, control a physical barrier proximate to the user to erect the physical barrier proximate to the user.

14. The non-transitory computer-readable medium of claim 13, wherein the instructions further include instructions that when executed by the processor cause the processor to:

predict the behavior of the user based on historical information.

15. The non-transitory computer-readable medium of claim 13, wherein the instructions further include instructions that when executed by the processor cause the processor to:

determine whether the user is outside the safe zone within the pedestrian path; and in response to the user being outside the safe zone, control the guide to output an alert.

16. The non-transitory computer-readable medium of claim 15, wherein the alert includes at least one of:

an audio alert;

a visual alert; or a haptic alert.

17. The non-transitory computer-readable medium of claim 13, wherein the guide includes at least one of:

a physical barrier;

a haptic system;

an audio system; or a visual display.

* * * * *